US008682644B1

(12) United States Patent
Davis (10) Patent No.: US 8,682,644 B1
(45) Date of Patent: Mar. 25, 2014

(54) MULTI-LANGUAGE SORTING INDEX (75) Inventor: Mark Davis, Menlo Park, CA (US)

(73) Assignee: Google Inc., Mountain View, CA (US)

(*) Notice: Subject to any disclaimer, the term of this patent is extended or adjusted under 35 U.S.C. 154(b) by 215 days.

(21) Appl. No.: 13/174,131

(22) Filed: Jun. 30, 2011

(51) Int. Cl.
*G06F 17/20* (2006.01)
*G06F 7/00* (2006.01)

(52) U.S. Cl.
USPC .................. 704/8; 707/100; 707/749

(58) Field of Classification Search
USPC ........................... 704/1–10
See application file for complete search history.

(56) References Cited

U.S. PATENT DOCUMENTS

| | | | |
|---|---|---|---|
| 5,148,541 A * | 9/1992 | Lee et al. ............... | 1/1 |
| 5,440,482 A | 8/1995 | Davis | |
| 5,732,260 A * | 3/1998 | Nomiyama ............... | 1/1 |
| 5,873,111 A * | 2/1999 | Edberg ............... | 715/202 |
| 6,389,387 B1 | 5/2002 | Poznanski et al. | |
| 6,557,004 B1 * | 4/2003 | Ben-Shachar et al. ..... | 707/706 |
| 7,165,020 B2 * | 1/2007 | Lissauer et al. ............... | 704/7 |
| 7,369,987 B2 | 5/2008 | Loofbourrow et al. | |
| 7,555,497 B2 * | 6/2009 | Thompson et al. ............ | 1/1 |
| 8,250,079 B2 * | 8/2012 | Scholtes et al. ............... | 707/750 |
| 2002/0177993 A1 * | 11/2002 | Veditz et al. ............... | 704/8 |
| 2005/0055354 A1 * | 3/2005 | Thompson et al. ......... | 707/100 |
| 2005/0251519 A1 * | 11/2005 | Davis ......................... | 707/100 |
| 2009/0024384 A1 * | 1/2009 | Kobayashi et al. ............ | 704/8 |
| 2009/0024599 A1 * | 1/2009 | Tata ............................ | 707/4 |
| 2011/0191354 A1 * | 8/2011 | Scholtes et al. ............... | 707/749 |

FOREIGN PATENT DOCUMENTS

WO 2009/154570 12/2009

* cited by examiner

*Primary Examiner* — David R Hudspeth
*Assistant Examiner* — Timothy Nguyen
(74) *Attorney, Agent, or Firm* — Morris & Kamlay LLP

(57) ABSTRACT

A multi-language sorting index may allow sort keys for multiple languages to be stored in an auxiliary table associated with a primary table in which the strings to be sorted are stored. Sort keys may be generated for each string and stored in the auxiliary table, with duplicate sort keys excluded. Queries for sorted data in the first table may use the auxiliary table to identify and sort the requested data.

20 Claims, 4 Drawing Sheets

MULTI-LANGUAGE SORTING INDEX

BACKGROUND

It is often desirable to sort a set of data, such as to arrange entries in alphabetical order. Different languages may have different sorting rules and conventions. For example, ö is sorted before z in Swedish, but after z in German. In some cases, variants also may exist within a single language. For example, German typically uses a different sorting order (the "German Phonebook" order) for phonebooks and similar publications than is used in other cases.

Support of language-specific sorting requirements may be complex, with increasing complexity as additional languages are to be supported.

To address this issue, sorting a collection of records in a database may be accomplished by using a sort key. A sort key typically is a string of bytes that encapsulates the sorting order for a string. Different sort key techniques may generate different sort keys. For example, the keys generated by the International Components for Unicode (ICU) software for the word "Töch" are:

4D 43 2B 35 01 85 9D 06 01 8F 08 00 for [Dutch, German]
4D 43 2F 2B 35 01 86 87 07 01 8F 08 00 for [German (Phonebook Sort Order)]
4D 43 36 04 01 85 9D 05 01 8F 07 00 for [Slovak]
4D 5A A3 06 2B 35 01 08 01 8F 07 00 for [Swedish]

The sort key may include a set of weights separated by a level separator that indicate how a string should be sorted. For example, the Dutch/German key above includes values for primary, secondary, and tertiary weights, 4D 43 2B 35, 85 9D 06, and 8F 08 00, respectively, separated by the level separator 01.

When the sort keys in a particular language for a set of data items are ordered, they in turn provide the appropriate sort order for the underlying data items. For example, a data set may include the following names and associated sort keys for the English language:

| Name | Sort Key |
| --- | --- |
| John Smith | A0 19 A9 23 |
| Alice Roberts | 8B 9H DD 91 |
| Alice Reynolds | 8B 9H 00 C3 |
| Robert Jones | DD 97 9A 4D |

When ordered by sort key using conventional English sorting rules (0-9, A-Z), the sorted data set is:

| Name | Sort Key |
| --- | --- |
| Alice Reynolds | 8B 9H 00 C3 |
| Alice Roberts | 8B 9H DD 91 |
| John Smith | A0 19 A9 23 |
| Robert Jones | DD 97 9A 4D |

Thus, the sort keys provide the appropriate sort order for the associated data, without having to apply additional sorting rules to the data directly.

BRIEF SUMMARY

Embodiments of the presently disclosed subject matter provide techniques for creating and using multi-language sort keys and sorting indexes. A multi-language sorting index may allow sort keys for multiple languages to be stored in an auxiliary table associated with a primary table in which the strings to be sorted are stored. Sort keys may be generated for each string and stored in the auxiliary table, with duplicate sort keys excluded. Queries for sorted data in the first table may use the auxiliary table to identify and sort the requested data.

Techniques for multi-language sorting according to embodiments of the disclosed subject matter may include receiving a string and, recursively, at each offset of the string, identifying each substring at the offset that is in a combined mapping table, where the combined mapping table maps substrings to collation elements. For each substring, the collation element in the combined mapping table that corresponds to the substring may be appended to a collation element sequence for the string, and the offset moved by the length of the substring. Upon reaching the end of the string, each collation element sequence for the string may be converted into a sort key.

Techniques for multi-language sorting according to embodiments of the disclosed subject matter may include, for each string in a plurality of strings in a first database table, calculating a sort key for the string. A reference record may be stored in a second database table, where the reference record links the sort key to a data record in the first database table that includes the string. A request may be received for a sorted result of a plurality of items in the first database table for a first language, and a result set generated that includes strings in the first database table based upon sort keys stored in the second table that correspond to the items in the first database table. The result set may then be sorted to remove strings in a language other than the first language, to remove duplicate strings, or a combination thereof, and the result set provided to a user.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

It is often necessary to provide data sorted according to a user's preferred language in contexts where multiple languages are supported for the same underlying data. For example, an address book program may include functionality to present a sorted list of a user's contacts. The order in which the contacts should be sorted may vary depending upon the language the user has configured the program to use. Thus, the program may need to be able to sort the same data in the correct order for any language supported by the program. This may be particularly important in configurations in which the contact list or a portion thereof is common to multiple people or entities, and/or is stored on remote servers, in a cloud-based service, or other similar configuration.

It also may be desirable to present a subset of sorted information, such as a list of users whose names start with "S", or are between two other names, such as "Johnson" and "Jones". The selection of specified data that belongs within the subset typically is done using a database SELECT statement or an equivalent construct. Such statements may be optimized for lookup, and may be faster than other techniques such as sequential filtering of data records.

Example SELECT statements in SQL to select a desired subset of data include
"SELECT * FROM Persons WHERE Name LIKE 's %'" to select names in a "Persons" table that begin with "S";
"SELECT * FROM Persons WHERE Name BETWEEN 'Johnson' AND 'Jones'" to select names in the "Persons" table between "Johnson" and "Jones"

Conventional database indexing techniques may be used to improve the speed at which SELECT-type operations are performed. However, separate indexes typically are required for each language supported by the database or by associated applications. Applications may support a large number of languages, which requires significant additional computing resources and expense.

Embodiments of the presently disclosed subject matter provide a multi-language sorting index that may allow for more efficient querying and/or sorting of data, particularly in implementations that support a relatively large number of languages. The multi-language sorting index may take advantage of the property of many collation implementations, such as ICU, that generate the same sort key across multiple languages for a given string. For example, Dutch and German have the same sort key for the strong "Töch". In many cases, a sort key for a string may be the same across many or all languages. For example, the sort key for "Tod" in ICU is 4D 43 2D 01 07 00 for all languages.

To construct a multi-language sorting index for a table of data, an auxiliary table may be constructed for the main table that stores the data to be sorted. The auxiliary table may include two fields: a sort key for the original item to be sorted, and a reference to one or more original records. When a new record is created in the main table, a sort key may be generated for the item for each supported language and a reference to the record added under each appropriate sort key in the auxiliary table. The auxiliary table may then be used to obtain an initial set of results for a given query for data from the main table, and the results filtered to return data in a selected language.

Figure 3:
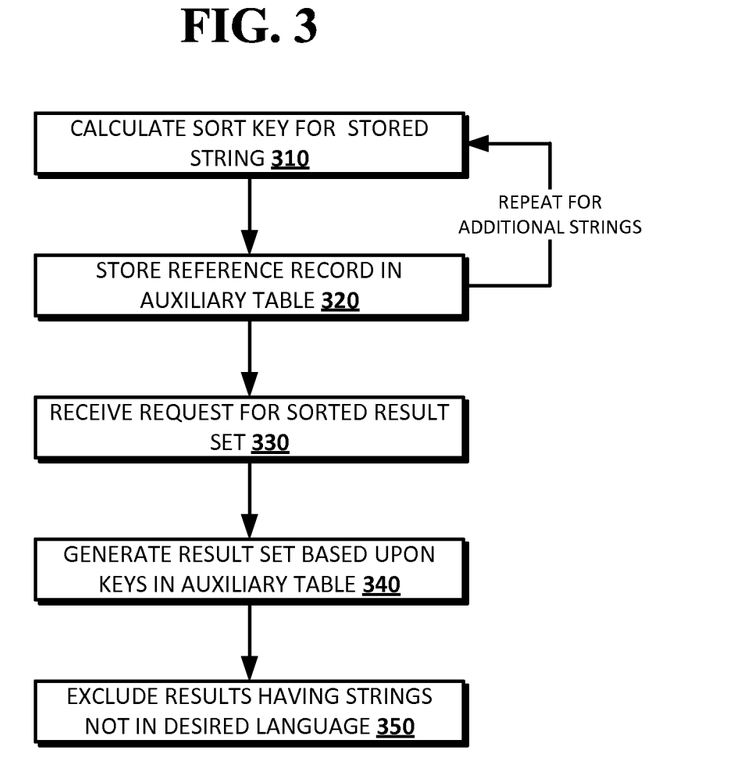
FIG. 3 shows an example process according to an embodiment of the presently disclosed subject matter.

FIG. 3 shows an example process according to an embodiment of the presently disclosed subject matter. At 310 a sort key is calculated for each of a set of strings stored in a database table. The string may be any data suitable for storage in a database that may be queried and/or sorted based upon a request. At 320, a reference record is stored in a second database table, such as an auxiliary table. The reference links the sort key to the data record in the first table that includes the string from which the sort key was generated. For example, the following database records may be stored:

| First Table | |
|---|---|
| ID | City |
| 1 | New York |
| 2 | Chicago |
| 3 | Paris |
| 4 | Kraków |

| Second Table | |
|---|---|
| City ID | Sort Key |
| 1 | 8367 27AA |
| 2 | 2294 DF20 |
| 3 | A033 0217 |
| 4 | 6482 2317 |

The steps at 310 and 320 may be repeated for each language to be supported by the database, i.e., each language in which results may be desired. If each language results in a different sort key for each entry in the first table, the second table would have M×N entries, where M is the number of entries in the first table, and N is the number of languages supported. However, typical techniques for generating sort keys likely will result in substantial duplication, where multiple languages will have the same sort key for a string. The languages for which search keys are generated also may include language variants or other sort orders. For example, "New York" may have a different sort key in a language variant in which spaces are ignored (i.e., "New York" is sorted as "newyork"). In some configurations, sort keys may be generated with a secondary strength, ignoring case and variant differences. Other variations may be used.

Continuing the example above, example tables for the database tables in a configuration that supports four languages may include the following:

| First Table | |
|---|---|
| ID | City |
| 1 | New York |
| 2 | Chicago |
| 3 | Paris |
| 4 | Kraków |

| Second Table | |
|---|---|
| City ID | Sort Key |
| 1 | 8367 27AA |
| 2 | 2294 DF20 |
| 3 | A033 0217 |
| 4 | 6482 2317 |
| 1 | 8367 DCC3 |
| 4 | 6482 2791 |

-continued

Second Table

| City ID | Sort Key |
|---------|----------|
| 4 | 6480 84CA |
| 4 | 647A 4720 |

In the example, "New York" results in two distinct search keys, "Krakow" in four distinct search keys, and each of "Chicago" and "Paris" a single search key. That is, "Chicago" and "Paris" have a common search key for each of the four languages, and "New York" may have, for example, a common search key across three languages and a distinct key for the fourth.

In some configurations, the auxiliary table also may store an indication of the language associated with each sort key. For example, the table may include a column to indicate the language for the stored keys, either by language identifier (e.g., "EN", "FR", etc.) or by other reference, such as an identifier that links the record to a language record in another table:

First Table

| ID | City |
|----|------|
| 1 | New York |
| 2 | Chicago |
| 3 | Paris |
| 4 | Kraków |

Second Table

| City ID | Sort Key | Lang ID |
|---------|----------|---------|
| 1 | 8367 27AA | 1 |
| 2 | 2294 DF20 | 1 |
| 3 | A033 0217 | 1 |
| 4 | 6482 2317 | 1 |
| 1 | 8367 DCC3 | 15 |
| 4 | 6482 2791 | 5 |
| 4 | 6480 84CA | 9 |
| 4 | 647A 4720 | 18 |

Referring still to FIG. 3, at 330 a request may be received for a sorted result of items from the first table. For example, a SELECT-type or other database command may be received that can be executed to retrieve a set of results from the table. In response, at 340 a result set may be generated that includes entries from the first database table. The result set may be generated based upon sort keys stored in the auxiliary table. For example, when a SELECT . . . BETWEEN startString AND endString is to be run on the first table, sort keys startSortKey and endSortKey may be generated for each of the startString and endString, respectively, for the language in which the request is received. An initial result set may then be constructed from all entries in the auxiliary table that have sort keys between startSortKey and endSortKey.

It will be apparent to one of skill in the art that other types of queries may be treated in a similar fashion to a SELECT . . . BETWEEN as described. For example, a query of the type SELECT . . . LIKE start % is logically the same as SELECT . . . BETWEEN start AND start<?>, where <?> represents a symbol greater than all other characters in the sort order, such as �. This process is also applicable to other syntaxes performing the same function as the SQL SELECT syntax.

The result set generated at 340 contains references to all the records whose entries are between startString and endString according to the user's language. However, it also may contain other strings as well, such as strings with sortKeys between startSortKey and endSortKey that are not in the user's language, or duplicate entries corresponding to strings that have the same character representation in different languages, but different search orders. At 350, the list of references may be filtered to remove references whose original record is less than the startString or greater than the endString in a desired language. The desired language may be determined, for example, based upon an explicit request from a user or other requestor, or based upon the language in which the query was received at 330. Similarly, if the result set contains any duplicate strings, they may be removed.

As another example, out of the strings "Tod", "Toch", "Tö", "Töd", "Tö\uFFFF", "Toe", "Toff", "Tot", "Toc", "Tzar", the SELECT BETWEEN "Tö" AND "Tot" for German Phonebook would be the following.

| Töd | 4D 43 2F 2D 01 86 87 06 00 | [German (Phonebook Sort Order)] |
| Toff | 4D 43 31 31 01 08 00 | [all] |
| Toch | 4D 43 36 04 01 07 00 | [Slovak] |
| Tot | 4D 43 4D 01 07 00 | [all] |

Thus, the initial result set will contain references to these four strings. The list of references may then be filtered by removing any references whose original record has a username that is less than "Tö" or greater than "Tot" according to German Phonebook sort ordering, which result from strings in other languages that happen to have sort keys in the selected range. In this example, the string "Toch" would be removed. This may be the expected behavior from the user's point of view, as "Toch" is not within the requested range in the selected language.

Embodiments of the presently disclosed subject matter may allow for a significant decrease in size requirements across languages compared to conventional techniques. The techniques disclosed herein also may provide increased benefits as the number of supported languages increases, and may scale to an arbitrary number of languages. For example, the larger the number of supported languages, the smaller the incremental difference may be in the auxiliary table per language due to the increased likelihood that multiple languages will share the same sort key for multiple strings.

As previously described, embodiments of the presently disclosed subject matter may use various techniques to generate sort keys. For example, sort keys may be generated using conventional techniques such as those provided by the International Components for Unicode (ICU) project (used by iOS, MacOS, Android, Chrome, and other systems), the Windows operating system, and POSIX.

Some techniques for creating a sort key start from an initial point in a string for which a sort key is to be generated, and find the collation elements corresponding to one or more characters starting at that point. As will be recognized by one of skill in the art, a collation element refers to a logical mapping from levels to a sequence of weights, such as those described by the Unicode Collation Algorithm. For example, sort keys used with embodiments of the presently disclosed subject matter may include primary, secondary, and tertiary weights separated by a particular character used as a level separator. The collation element(s) and the number of characters to advance are returned, and the process continues for the remainder of the string. Such techniques may use a Collation Element Mapping Table that stores sequences of characters and associated sequences of collation elements to map, for example,     string→><CollationElement1, CollationElement2, . . . CollationElementK> where CollationElement1, . . . , CollationElementK represents the set of collation elements generated by stepping through the string, based upon the Collation Element Mapping Table.

Other techniques may be used. According to an embodiment of the presently disclosed subject matter, a parallel sort key generation technique may be used to generate multiple sort keys. A parallel sort key generation technique may generate all the sort keys for a given string, or all the sort keys for a given string for any languages supported by the application that implements the generation technique. In some cases, a parallel sort key generation technique may generate additional sort keys that are not used by any language or by any supported language.

In an embodiment of the presently disclosed subject matter, a Collation Element Mapping Tables for each supported language may be combined into a Combined Mapping Table, which maps from sequences of characters to a set of sequences of collation elements:

string→>{<CollationElement1, CollationElement2, . . . >, <CollationElement3>, . . . } where each <CollationElement1, . . . , CollationElementK> is a sequence of collation elements generated for the string.

Because there often may be a high degree of sharing across languages for Collation Element Mapping Tables, the Combined Mapping Table size may be a fraction of the sum of the sizes of the Collation Element Mapping Tables for each of the languages. As disclosed in further detail herein, a Combined Mapping Table also may be used to generate multiple sort keys at in a single pass. An example illustrative Combined Mapping Table for an example set of characters may include the following:

| Character Sequence | Collation Elements | Languages |
|---|---|---|
| a | {27 ; 05 ; 05} | All |
| c | {2B ; 05 ; 05} | All |
| d | {2D ; 05 ; 05} | All |
| e | {2F ; 05 ; 05} | All |
| f | {31 ; 05 ; 05} | All |
| h | {35 ; 05 ; 05} | Dutch, German, German (Phonebook Order), Swedish |
| ch | {36 04 ; 05 ; 05} | Slovak |
| o | {43 ; 05 ; 05} | All |
| ö | {43 ; 05 ; 05} {; 9D ; 05} | Dutch, German, Slovak |
| ö | {43 ; 87 ; 05} {2F ; 05 ; 05} | German (Phonebook Order) |
| r | {49 ; 05 ; 05} | All |
| t | {4D ; 05 ; 05} | All |
| T | {4D ; 05 ; 8F} | All |
| z | {59 ; 05 ; 05} | All |
| ö | {5A A3 ; 05 ; 05} {06 ; ; C0} | Swedish |
| ◆ | {EF EE ; 05 ;05} | All |

The collation elements may indicate the weights that should be assigned to each level in a sort key. For example, the collation element for "T" above indicates that the primary weight consists of one byte, 4D, the secondary weight consists of one byte, 05, and the tertiary weight consists of one byte, 8F. Generally a 05 byte indicates no special weight, while the byte 8F marks an uppercase. In some configurations the Table may exclude the languages or locales associated with the collation elements, such as the "Languages" column shown above.

Figure 4:
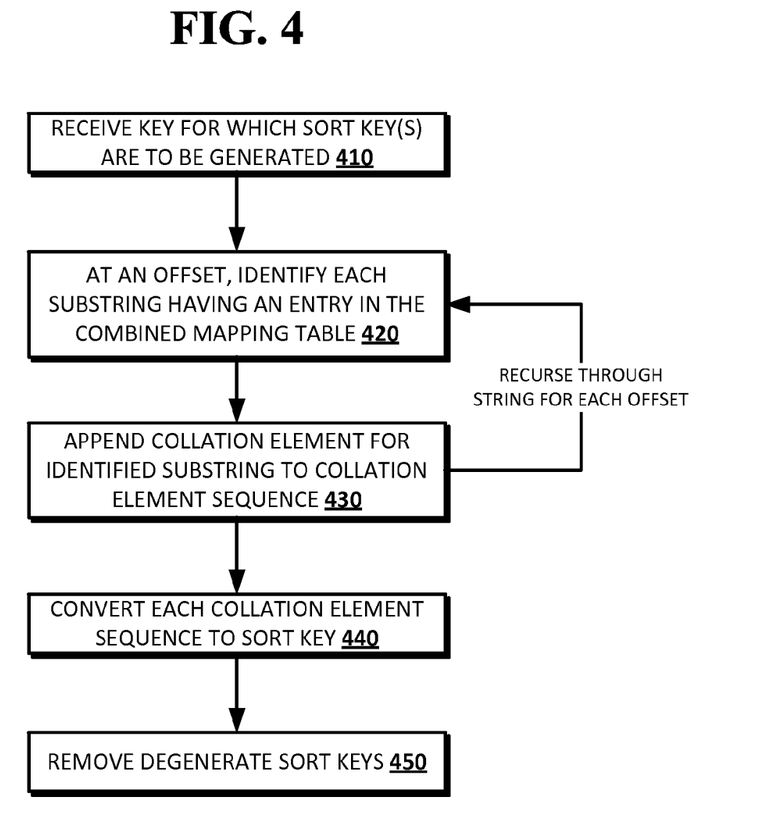
FIG. 4 shows an example technique for generating sort keys using a Combined Mapping Table according to an embodiment of the presently disclosed subject matter.

FIG. 4 shows an example technique for generating sort keys using a Combined Mapping Table as shown above. At 410, a string is received for which sort keys are to be generated. For example, a data item may be added to a main (first) database table as previously described, for which it is desired to generate one or more sort keys. At 420, at an offset of the string, each substring in the string that exists in a Combined Mapping Table may be identified. As previously indicated, the Combined Mapping Table maps substrings to collation elements. For each identified substring, at 430 an associated collation element in the Combined Mapping Table may be appended to a collation element sequence for the string. Steps 420-430 may be performed recursively through the entire string to generate each possible sort key for the string. At 440, the collation element sequence may be converted into a sort key, for example by concatenating the weights for each level of the collation elements in the sequence, or otherwise grouping them as appropriate for a particular sort key format. At 450, degenerate sort keys, if any, may be removed from the set of sort keys. Alternatively, degenerate sort keys may be retained. For example, it may be more efficient to retain the degenerate keys rather than expend processing resources to identify and remove them from the set of sort keys.

Degenerate sort keys may be generated that would not be generated in any of the supported languages using conventional sort key generation techniques. For example, an illustrative configuration may include the following mappings:

Language 1
    "ab"→><CE1>
    "C"→><CE2>
Language 2
    "a"→><CE3>
    "b"→><CE4>
    "c"→><CE5>

Sort keys generated according to conventional techniques may include <CE1, CE2> for Language 1, and <CE3, CE4, CE5> for Language 2. A parallel sort key generation technique according to an embodiment of the presently disclosed subject matter may produce one or more extra collation element sequences, for example, <CE1, CE5> (generating CE1 from "ab" in Language 1, and CD5 from "c" in Language 2), even though the sort key <CE1, CE5> would not be used by either language. In general, the number of degenerate cases may be relatively small.

As an example, the following pseudocode may be implemented to generate sort keys for a provided string:

```
public void getSortKeys(String input, Set<SortKey> output) {
    output.clear( );
    getSortKeys(input, 0, new CeSequence( ), output);
}
public void getSortKeys(String input, int offset, CeSequence soFar,
Set<SortKey> output) {
    if(offset < input.length( )) {
        for (LengthAndCeSequence pair : getMatches(input, offset)) {
            getSortKeys(input, offset + pair.length( ),
                soFar.append(pair.getCeSequence( )), output);
        }
    } else {
        output.add(convert(soFar));
    }
}
```

Figure 5:
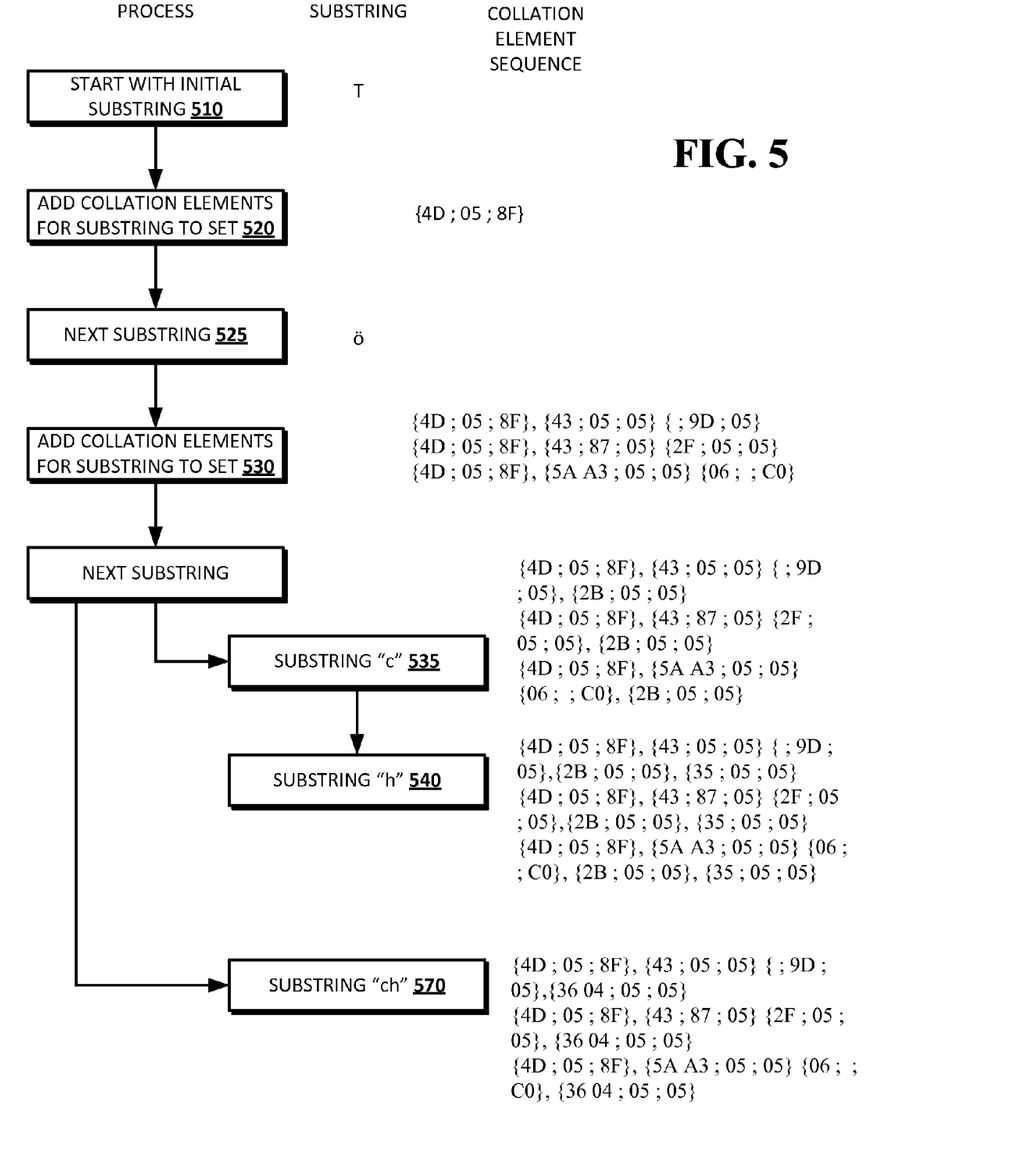
FIG. 5 shows a specific example of sort key generation for the string according to an embodiment of the presently disclosed subject matter.

FIG. 5 shows a specific example of sort key generation for the string "Töch"" according to an embodiment of the presently disclosed subject matter, using the illustrative Combined Mapping Table previously described. At 510, the technique begins by considering the substring "T". In the combined mapping table, the substring "T" is associated with the collation element sequence {4D00; 5; 8F}. Thus, at 520, the element sequence is added to the set of collation elements, and the initial set is merely {4D00; 5; 8F}. At 525, the following substring "ö" is considered. The substring is associated with three sets of two element sequences in the Combined Mapping Table, each of which is appended to the existing set of collation element sequences at 530 to form the following sequences:
{4D; 05; 8F}, {43; 05; 05} {; 9D; 05} [Dutch, German, Slovak]
{4D; 05; 8F}, {43; 87; 05} {2F; 05; 05} [German (Phonebook)]
{4D; 05; 8F}, {5A A3; 05; 05} {06; C0} [Swedish]
As previously indicated, the languages associated with each newly-added collation elements are provided for reference, but may not be included in generated collation element sequences.

At 535, the next substring "c" in the string is considered, and any associated collation element sequences from the Combined Mapping Table are appended to the existing sets of collation element sequences:
{4D; 05; 8F}, {43; 05; 05} {; 9D; 05}, {2B; 05; 05} [Dutch, German, Slovak]
{4D; 05; 8F}, {43; 87; 05} {2F; 05; 05}, {2B; 05; 05} [German (Phonebook)]
{4D; 05; 8F}, {5A A3; 05; 05} {06; C0}, {2B; 05; 05} [Swedish]

Similarly, at 540, the next substring "h" is considered and any collation element sequences associated with the substring "h" are appended to the existing sequences:
{4D; 05; 8F}, {43; 05; 05} {; 9D; 05},{2B; 05; 05}, {35; 05; 05}
{4D; 05; 8F}, {43; 87; 05} {2F; 05; 05},{2B; 05; 05}, {35; 05; 05}
{4D; 05; 8F}, {5A A3; 05; 05} {06; C0}, {2B; 05; 05}, {35; 05; 05}
However, {35; 05; 05} is not a collation element sequence for Slovak, so the first set of sequences may not be used for Slovak implementations. As previously disclosed, techniques according to embodiments of the presently disclosed subject matter may consider a string recursively, so as to identify and add collation elements associated with each possible substring in the string.

For example, at 570 various other substrings may be considered, such as "Tö", "öc", "ch", "Töc", and "öch", and may be considered. Each string also may be considered during the process described earlier. For example, instead of considering the string "ö" after "T", "öc" may be considered as well. Thus, the process of building sort keys may be considered as a recursive, branching technique, in which an additional branch is constructed for each identified substring that has an entry in the Combined Mapping Table. The only additional substring having an entry in the illustrative Combined Mapping Table is "ch". Thus, in addition to the above sets of collation element sequences, the following sequences may be generated (using "ch" after "T" and "ö" instead of the "c" and "h" substrings):
{4D; 05; 8F}, {43; 05; 05} {; 9D; 05},{36 04; 05; 05}
{4D; 05; 8F}, {43; 87; 05} {2F; 05; 05}, {36 04; 05; 05}
{4D; 05; 8F}, {5A A3; 05; 05} {06; C0}, {36 04; 05; 05}
Thus, the complete set of collation element sequences in the example includes:
{4D; 05; 8F}, {43; 05; 05} {; 9D; 05},{2B; 05; 05}, {35; 05; 05}
{4D; 05; 8F}, {43; 87; 05} {2F; 05; 05},{2B; 05; 05}, {35; 05; 05}
{4D; 05; 8F}, {5A A3; 05; 05} {06; C0}, {2B; 05; 05}, {35; 05; 05}
{4D; 05; 8F}, {43; 05; 05} {; 9D; 05},{36 04; 05; 05}
{4D; 05; 8F}, {43; 87; 05} {2F; 05; 05}, {36 04; 05; 05}
{4D; 05; 8F}, {5A A3; 05; 05} {06; C0}, {36 04; 05; 05}
In the illustrative Combined Mapping Table, the "ch" substring only has a collation element sequence for Slovak, so the final two sets listed above may represent "degenerate" sets or sort keys that do not correspond to sort keys that are used by any supported language.

After the sets of collation element sequences have been generated at 540 and 570, the sets of collation element sequences may be converted to sort keys. For example, the final set of sequences shown above may be converted to the following sort keys:
4D 43 2B 35 01 85 9D 06 01 8F 08 00 [Dutch, German]
4D 43 2F 2B 35 01 86 87 07 01 8F 08 00 [German (Phonebook Sort Order)]
4D 43 36 04 01 85 9D 05 01 8F 07 00 [Slovak]
4D 5A A3 06 2B 35 01 08 01 8F 07 00 [Swedish]
As will be understood by one of skill in the art, a sort key as shown above may be generated from the corresponding sequence of weights by building a sequence that includes the primary weights, followed by a separator such as "01". The secondary weights and a second separator are then appended to the end of the sequence, followed by the tertiary weights and a terminator such as "00" in the example. The sequence of weights can be compressed. For example, the sequence of secondary weights 05 05 D9 05 05 in the example above may be compressed in an ICU scheme to the three bytes 85 9D 06. Similarly, ICU compresses the sequence of five tertiary weights 8F 05 05 05 05 to the two bytes 8F 08. Similar compression schemes may be used by other encoding techniques.

Figure 1:
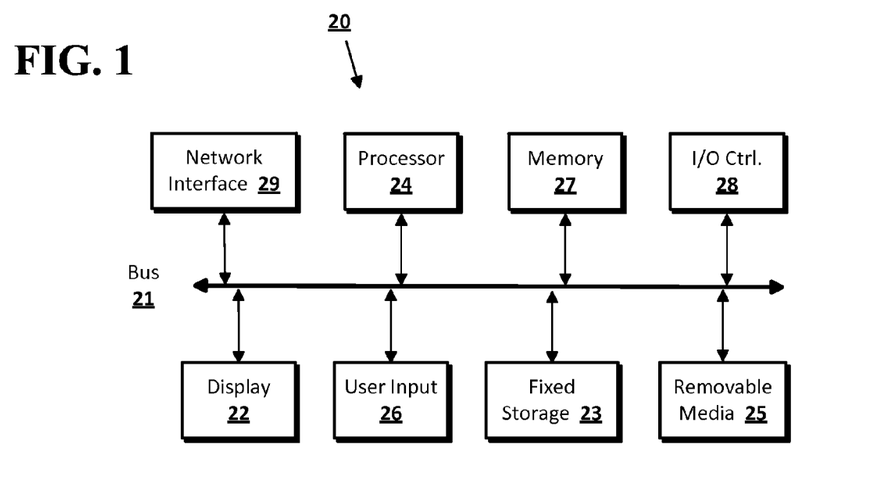
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
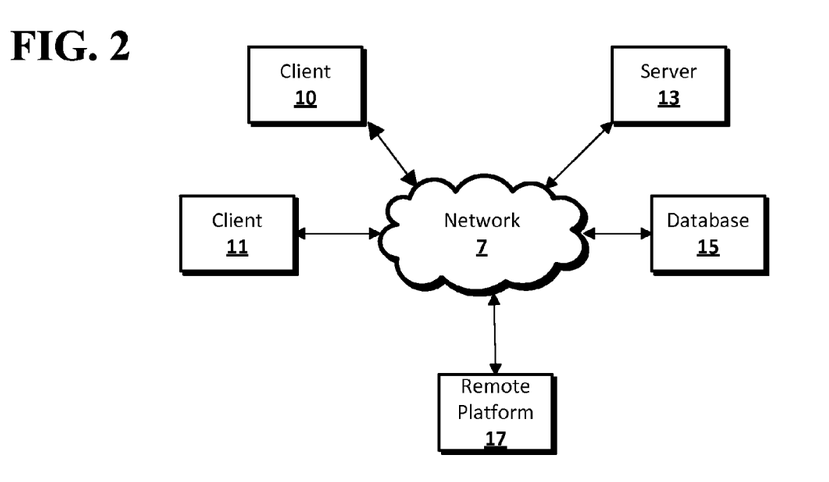
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
for a first string in a plurality of strings in a first database table, the plurality of strings including at least one string in a first language and at least one string in a second language different from the first language:
calculating a first sort key for the first string in the first language;
storing a first reference record in a second database table, the first reference record linking the first sort key to a data record in the first database table that includes the first string;
calculating a second sort key for the first string in the second language; and
storing a second reference record in the second database table, the second reference record linking the second sort key to the data record in the first database table that includes the first string;
receiving a request for a sorted result of a plurality of items in the first database table for the first language;
generating a result set, the result set including a first entry for the first string, wherein the position of the first entry in the result set is determined based upon the first sort key;
filtering the result set to remove entries for strings in the second language; and
providing the result set to a user.

2. A method according to claim 1, further comprising:
calculating a sort key for the string in each of a plurality of languages; and
storing a reference record in the second database table for each calculated sort key that is not a duplicate of a sort key previously stored in the second database table.

3. A method according to claim 1, further comprising the step of filtering the result set to remove duplicate entries for strings having more than one entry in the result set.

4. A method according to claim 1, wherein the request specifies a start string and an end string, and wherein the step of generating the result set further comprises:
   generating a start sort key for the start string in the first language;
   generating an end sort key for the end string in the first language;
   identifying sort keys in the second database table that are between the start sort key and the end sort key; and
   adding entries for strings in the first database linked to the identified sort keys to the result set.

5. A method according to claim 1, wherein the step of filtering the result set to remove strings not in the first language further comprises:
   removing strings from the result set that are not sorted between the start string and the end string according to sort rules for the first language.

6. A method according to claim 1, further comprising the step of, prior to providing the result set to the user, sorting the result set according to the sort keys associated with the strings in the result set.

7. A system comprising:
   a database storing a plurality of strings in a first database table, the plurality of strings including at least one string in a first language and at least one string in a second language different from the first language;
   an input configured to receive a request for a sorted result of a plurality of items in the first database table for a first language;
   a processor configured to:
      for a first of the plurality of strings, calculate a first sort key for the string and store a first reference record in a second database table, the first reference record linking the sort key to a data record in the first database table that includes the first string;
      calculate a second sort key for the first string in a second language different from the first language, and store a second reference record in the second database table, the second reference record linking the second sort key to the data record in the first database table that includes the first string;
      generate a result set, the result set including a first entry for the first string, wherein the position of the first entry in the result set is determined based upon the first sort key; and
      filter the result set to remove entries for strings in the second language; and
   an output configured to provide the result set to a user.

8. A system according to claim 7, the processor further configured to:
   calculate a sort key for the string in each of a plurality of languages; and
   store a reference record in the second database table for each calculated sort key that is not a duplicate of a sort key previously stored in the second database table.

9. A system according to claim 7, the processor further configured to filter the result set to remove duplicate entries for strings having more than one entry in the result set.

10. A system according to claim 7, wherein the request specifies a start string and an end string, and wherein the processor is further configured to:
   generate a start sort key for the start string in the first language;
   generate an end sort key for the end string in the first language;
   identify sort keys in the second database table that are between the start sort key and the end sort key; and
   add entries for strings in the first database linked to the identified sort keys to the result set.

11. A system according to claim 7, the processor further configured to remove strings from the result set that are not sorted between the start string and the end string according to sort rules for the first language.

12. A system according to claim 7, the processor further configured to, prior to providing the result set to the user, sort the result set according to the sort keys associated with the strings in the result set.

13. A non-transitory computer-readable storage medium storing a plurality of instructions which cause a processor to perform a method comprising:
   for a first string in a plurality of strings in a first database table, the plurality of strings including at least one string in a first language and at least one string in a second language different from the first language:
   calculating a first sort key for the first string in a first language; storing a first reference record in a second database table, the first reference record linking the first sort key to a data record in the first database table that includes the first string;
   calculating a second sort key for the first string in a second language different from the first language; and
   storing a second reference record in the second database table, the second reference record linking the second sort key to the data record in the first database table that includes the first string;
   receiving a request for a sorted result of a plurality of items in the first database table for the first language;
   generating a result set, the result set including a first entry for the first string wherein the position of the first entry in the result set is determined based upon the first sort key;
   filtering the result set to remove entries for strings in the second language; and
   providing the result set to a user.

14. A computer-readable medium according to claim 13, said method further comprising:
   calculating a sort key for the string in each of a plurality of languages; and
   storing a reference record in the second database table for each calculated sort key that is not a duplicate of a sort key previously stored in the second database table.

15. A computer-readable medium according to claim 13, said method further comprising the step of filtering the result set to remove duplicate entries for strings having more than one entry in the result set.

16. A computer-readable medium according to claim 13, wherein the request specifies a start string and an end string, and wherein the step of generating the result set further comprises:
   generating a start sort key for the start string in the first language;
   generating an end sort key for the end string in the first language;
   identifying sort keys in the second database table that are between the start sort key and the end sort key; and
   adding entries for strings in the first database linked to the identified sort keys to the result set.

17. A computer-readable medium according to claim 13, wherein the step of filtering the result set to remove strings not in the first language further comprises:
   removing strings from the result set that are not sorted between the start string and the end string according to sort rules for the first language.

18. A computer-readable medium according to claim 13, said method further comprising the step of, prior to providing the result set to the user, sorting the result set according to the sort keys associated with the strings in the result set.

19. A method according to claim 1, wherein the result set includes a second entry for the first string, the position of the second entry in the result set being determined based upon the second sort key.

20. A method according to claim 19, wherein the step of filtering the result set comprises removing the second entry for the first string based upon a language identifier associated with the second reference.

* * * * *